United States Patent
Jung

(10) Patent No.: US 7,161,977 B1
(45) Date of Patent: Jan. 9, 2007

(54) RECEIVER HAVING A RATIO-BASED SIGNAL ACQUISITION METHOD

(75) Inventor: Jaewoo Jung, Palo Alto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 821 days.

(21) Appl. No.: 10/354,213

(22) Filed: Jan. 28, 2003

(51) Int. Cl.
*H04B 1/00* (2006.01)

(52) U.S. Cl. .................... 375/150; 375/142; 375/343

(58) Field of Classification Search ........ 375/140–143, 375/147, 150, 152, 343
See application file for complete search history.

(56) References Cited

U.S. PATENT DOCUMENTS

| | | | |
|---|---|---|---|
| 5,402,450 A | 3/1995 | Lennen | 375/343 |
| 5,812,593 A * | 9/1998 | Kaku | 375/150 |
| 6,133,871 A | 10/2000 | Krasner | 342/357.02 |
| 6,701,133 B1 * | 3/2004 | Bennett et al. | 455/71 |
| 6,775,319 B1 * | 8/2004 | King et al. | 375/150 |

OTHER PUBLICATIONS

David M. Lin & James B. Y. Tsui, "An Efficient Weak Signal Acquisition Algorithm for a Software GPS Receiver", Proceedings of Institute of Navigation Global Positioning System (ION GPS) conference, Sep. 11-14, 2001, Salt Lake City, Utah, pp. 115-136.

Dennis M. Akos, Per-Ludvig Normark, Jeong-Taek Lee, Konstantin G. Gromov, James B. Y. Tsui & John Schamus, "Low Power Global Navigation Satellite System (GNSS) Signal Detection and Processing", Proceedings of Institute of Navigation Global Positioning System (ION GPS) conference, Sep. 19-22, 2000, Salt Lake City, Utah, pp. 784-791.

* cited by examiner

*Primary Examiner*—Jay K. Patel
*Assistant Examiner*—David B. Lugo
(74) *Attorney, Agent, or Firm*—David R. Gildea

(57) ABSTRACT

A GPS receiver having a ratio-based signal acquisition method. The GPS receiver has a tentative signal acquisition when a first ratio of the largest GPS signal correlation value to the second largest in a first time period exceeds a selected qualification ratio. The GPS receiver verifies signal acquisition when the average of iteration ratios for largest to second largest correlation values in iteration time periods exceed the qualification ratio.

26 Claims, 11 Drawing Sheets

| | | |
|---|---|---|
| $R_Q$ | 1.40 | SELECTED QUALIFICATION RATIO |
| $R_V$ | 1.40 | SELECTED VERIFICATION RATIO |
| $Vpk1_1$ | 900 | LARGEST CORRELATION VALUE, 1st PERIOD |
| $Vpk2_1$ | 600 | 2nd LARGEST CORRELATION VALUE, 1st PERIOD |
| $R_1$ | 1.50 | RATIO $Vpk1_1/Vpk2_1$ |
| $R_1 > R_Q$ | YES | TENTATIVE ACQUISITION DETECTION |
| $Ppk1_2$ | YES | CODE PHASE $Ppk1_2$ MATCHES $Ppk1_1$ |
| $Vpk1_2$ | 9000 | MEASURED CORRELATION VALUE, 2nd PERIOD |
| $Vpk2_2$ | 1897 | MEASURED CORRELATION VALUE, 2nd PERIOD |
| $R_2$ | 4.74 | RATIO $Vpk1_2/Vpk2_2$ |
| $R_C$ | 3.12 | AVERAGE OF RATIO $R_1$ AND RATIO $R_2$ |
| $R_C > R_V$ | YES | VERIFIED ACQUISITION DETECTION |

SIGNAL ENVIRONMENT A

FIG. 7A

| | | |
|---|---|---|
| $R_Q$ | 1.40 | SELECTED QUALIFICATION RATIO |
| $R_V$ | 1.40 | SELECTED VERIFICATION RATIO |
| $Vpk1_1$ | 1300 | MEASURED CORRELATION VALUE (noise B Vpk), 1st PERIOD |
| $Vpk2_1$ | 900 | MEASURED CORRELATION VALUE, 1st PERIOD |
| $R_1$ | 1.44 | RATIO $Vpk1_1/Vpk2_1$ |
| $R_1 > R_Q$ | YES | TENTATIVE ACQUISITION DETECTION |
| $Ppk1_2$ | NO | CODE PHASE $Ppk1_2$ MATCHES $Ppk1_1$ |
| | | TENTATIVE ACQUISITION DETECTION DISCARDED |

SIGNAL ENVIRONMENT B

FIG. 7B

| | | |
|---|---|---|
| $R_Q$ | 1.40 | SELECTED QUALIFICATION RATIO |
| $R_V$ | 1.40 | SELECTED VERIFICATION RATIO |
| $Vpk1_1$ | 267 | MEASURED CORRELATION VALUE (C Vpk), 1st PERIOD |
| $Vpk2_1$ | 179 | MEASURED CORRELATION VALUE, 1st PERIOD |
| $R_1$ | 1.49 | RATIO $Vpk1_1/Vpk2_1$ |
| $R_1 > R_Q$ | YES | TENTATIVE ACQUISITION DETECTION |
| $Ppk1_2$ | YES | CODE PHASE $Ppk1_2$ MATCHES $Ppk1_1$ |
| $Vpk1_2$ | 2670 | MEASURED CORRELATION VALUE, 2nd PERIOD |
| $Vpk2_2$ | 566 | MEASURED CORRELATION VALUE, 2nd PERIOD |
| $R_2$ | 4.72 | RATIO $Vpk1_2/Vpk2_2$ |
| $R_C$ | 3.10 | AVERAGE OF RATIO $R_1$ AND RATIO $R_2$ |
| $R_C > R_V$ | YES | VERIFIED ACQUISITION DETECTION |

SIGNAL ENVIRONMENT C

FIG. 7C

RECEIVER HAVING A RATIO-BASED SIGNAL ACQUISITION METHOD

BACKGROUND OF THE INVENTION

1. Field of the Invention

The invention relates generally to global positioning system (GPS) receivers and more particularly to a GPS receiver having a ratio-based signal acquisition method.

2. Description of the Prior Art

All global positioning system (GPS) receivers have some signal acquisition method for acquiring the GPS signal. Prior GPS receivers used threshold-based acquisition methods where signal acquisition is detected when the largest GPS correlation value exceeds a selected threshold. FIG. 1A is a chart showing three correlation value plots A, B, and C with respect to a fixed threshold versus code phase for three signal environments A, B and C, respectively. Signal environment A represents an open sky environment, signal environment B represents a case where ambient noise is high, and signal environment C represents a case where all noise and signals are attenuated.

Most prior art GPS receivers use the same fixed threshold for all signal environments. For the open sky environment A, a largest correlation value, signal A Vpk, exceeds the threshold at a code phase A Ppk. In this case, the prior art receiver successfully finds signal power at the code phase A Ppk. However in the high noise signal environment B, the noise results in a largest correlation value, noise B Vpk, at a code phase B Ppk. The correlation value B Vpk exceeds the threshold so the prior art threshold-based receiver falsely detects power at the code phase B Ppk. The false detection results in excess time and battery power being used. In the high attenuation environment C, both noise and signal are attenuated. The attenuation results in the lower correlation values. The largest correlation value, signal C Vpk, is greater than the noise in the signal environment C but, due to the attenuation, the correlation value C Vpk does not exceed the threshold. The prior art threshold-based receiver cannot detect the signal power at the code phase C Ppk and the true signal is missed.

There have been several attempts to maximize the probably of detecting true signal power and minimize the probably of false detections by varying the threshold according to the signal environment. Either a human user enters the environment type or the receiver attempts to determine the environment from characteristics of the incoming signal. However, none of these attempts have been entirely successful.

Therefore, there is a need for a signal acquisition algorithm that avoids false signal detection in a high noise signal environment and detects a true signal in a high attenuation signal environment.

SUMMARY OF THE INVENTION

It is therefore an object of the present invention to provide a signal receiver using a ratio-based detection method that avoids false signal acquisition in a high noise environment and does not miss true signal power in a high attenuation environment.

Briefly, a signal receiver of the present invention detects signal power based upon the ratio of the largest correlation value of an incoming signal to the second largest correlation value. FIG. 1B is chart illustrating a ratio-based acquisition detection of the present invention. The chart shows correlation values versus code phases, respectively. Tentative signal acquisition is detected in a first signal time period when a ratio between the largest correlation value Vpk1 and the second largest correlation value Vpk2 exceeds a selected qualification ratio. The tentative acquisition is verified when succeeding largest correlation values Vpk1 in succeeding signal time periods occur at the same code phase Ppk1; and a corroboration ratio derived from succeeding ratios of the largest and second largest correlation values Vpk1 and Vpk2 in succeeding signal time periods exceeds a verification ratio. The second largest correlation value Vpk2 is restricted to code phases outside of the code phase range Pdq in order to disqualify code phases near to the code phase Ppk1.

These and other objects of the present invention will no doubt become obvious to those of ordinary skill in the art after having read the following detailed description of the preferred embodiments which are illustrated in the various figures.

IN THE DRAWINGS

FIGS. 7A, 7B and 7C are correlation value charts illustrating a threshold-based acquisition detection of the prior art for signal environments A, B and C, respectively, of FIG. 6.

DETAILED DESCRIPTION OF THE PREFERRED EMBODIMENTS

Figure 2:
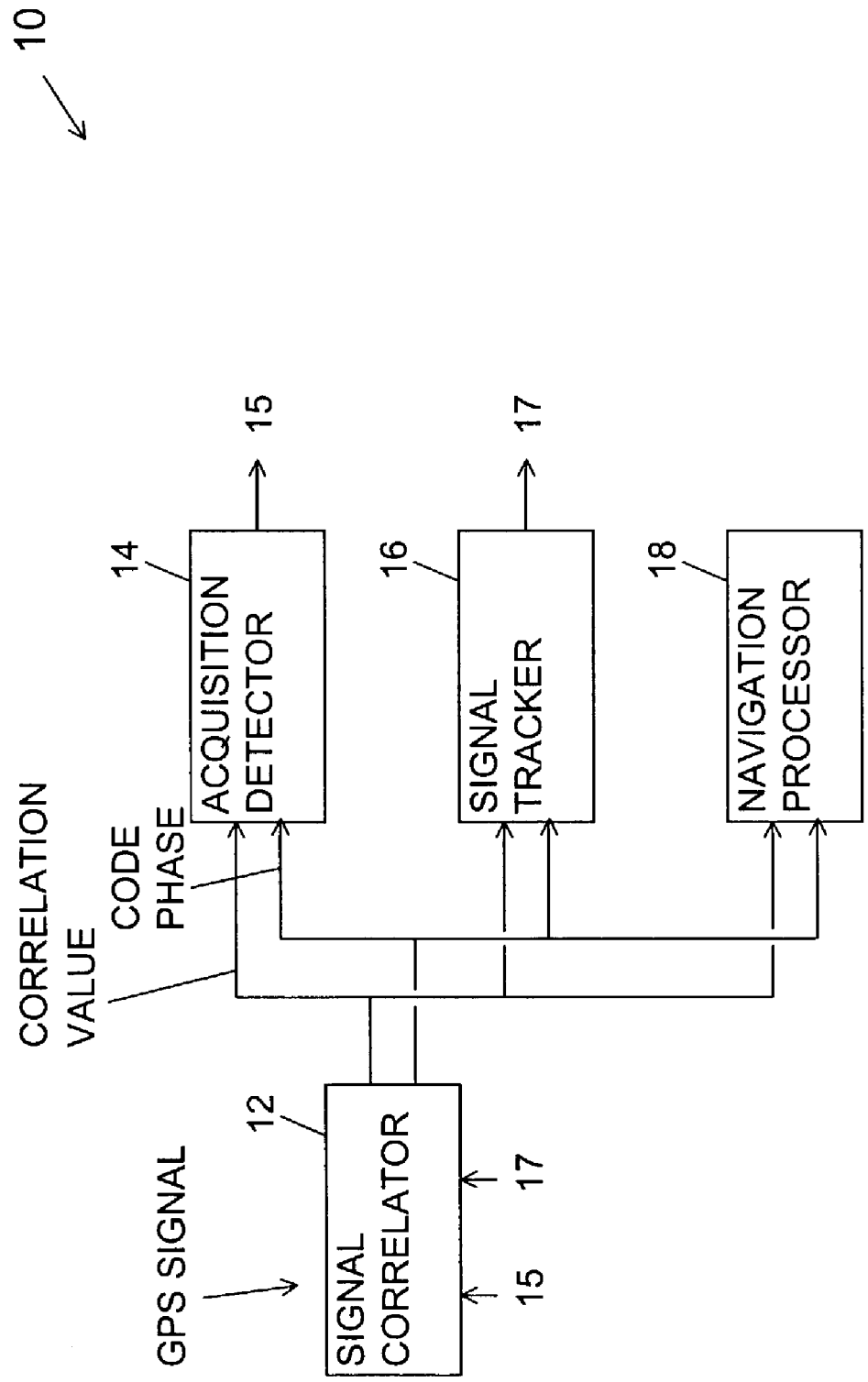
FIG. 2 is a block diagram of a signal receiver of the present invention.

FIG. 2 is a block diagram of a signal receiver of the present invention referred to by the general reference number 10. Although the receiver 10 is described in terms of the global positioning system (GPS) signal, the idea of the receiver 10 can equally well be applied to other direct sequence spread spectrum (DSSS) signals including CDMA communication signals and the GLONASS positioning system signal.

The receiver 10 includes a signal correlator 12, an acquisition detector 14, a signal tracker 16, and a navigation processor 18. The signal correlator 12 receives an airwave radio frequency (RF) GPS signal and issues correlation values between the GPS signal and internal replicas, and issues corresponding code phases between the signal and the replicas. The acquisition detector 14 uses the code phases and correlation values for providing feedback 15 to the signal correlator 12 for acquiring the GPS signal. After the GPS signal has been acquired, the signal tracker 16 uses the code phases and correlation values for providing feedback 17 to the signal correlator 12 for tracking the GPS signal. When the GPS signal is being tracked, the navigation processor 18 uses the code phases and correlation values for determining a location for the receiver 10. The GPS signals from several GPS satellites are processed essentially simultaneously in the signal correlator 12 and the acquisition detector 14 for acquiring the GPS signals; then processed in the signal correlator 12, the signal tracker 16, and the navigation processor 18 for tracking the GPS signals and determining the location of the receiver 10.

Figure 3:
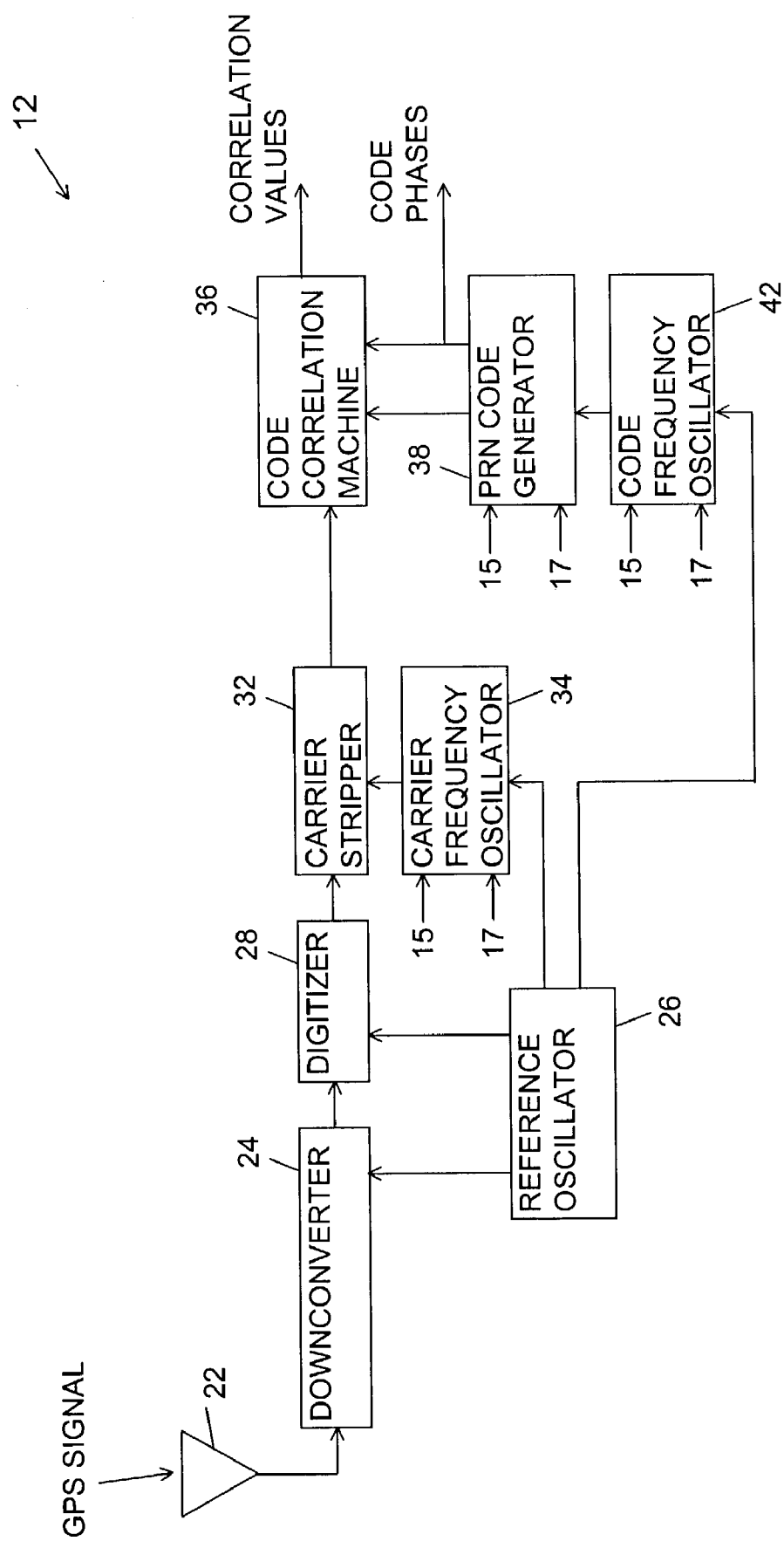
FIG. 3 is a block diagram of a signal correlator of the receiver of FIG. 2.

FIG. 3 is a block diagram of the signal correlator 12 for the receiver 10. The signal correlator 12 includes an antenna 22, a frequency downconverter 24, a reference oscillator system 26, and a digitizer 28. The antenna 22 converts the airwave RF GPS signal into a conducted GPS signal. The downconverter 24 uses a reference frequency from the reference oscillator system 26 for frequency downconverting the RF GPS signal to a lower frequency. The digitizer 28 uses a reference frequency from the reference oscillator system 26 for converting the lower frequency GPS signal from an analog GPS signal into digital GPS signal.

The signal correlator 12 also includes a carrier stripper 32, a carrier frequency oscillator 34, a code correlation machine 36, a pseudorandom (PRN) code generator 38, and a code frequency oscillator 42. The carrier stripper 32 multiplies the digital GPS signal times a carrier replica frequency and issues an intermediate digital GPS signal. The carrier frequency oscillator 34 provides the carrier replica frequency based upon a reference frequency from the reference oscillator system 26 and the feedback 15 from the acquisition detector 14 while the GPS signal is being acquired and the feedback 17 from the signal tracker 16 while the GPS signal is being tracked.

The code correlation machine 36 includes several correlators for comparing the intermediate digital GPS signal from the carrier stripper 32 to a replica PRN code from the PRN code generator 38. Each GPS satellite is distinguished by a distinct PRN code designated by the GPS system specification. The PRN code generator 38 uses the feedback 15 while the GPS signal is being acquired or the feedback 17 while the GPS signal is being tracked for selecting particular PRN codes out of several GPS PRN codes that are specified for the GPS satellites and providing the PRN code at all code phases. The PRN code phases may be provided either in serial or parallel. The code correlation machine 36 uses either time or frequency domain processing and accumulates correlation values for code phases, respectively. The correlation values and the code phases are provided to the acquisition detector 14, the signal tracker 16, and the navigation processor 18. The rate of the replica code from the PRN code generator 38 is controlled by a code frequency from the code frequency generator 42 based upon a reference frequency from the reference oscillator system 26 and the feedback 15 while the GPS signal is being acquired or the feedback 17 while the GPS signal is being tracked. An embodiment for a GLONASS receiver differs slightly in that the PRN code is fixed and the RF frequencies are selected for the GLONASS satellites, respectively, as designated by the GLONASS system specifications.

For signal acquisition, the signal correlator 12 may operate real time, that is a piece of the GPS signal is compared to a piece of the replica code as the signal piece arrives. However, preferably, the digitizer 28, the carrier stripper 32, and/or the code correlation machine 36 have memory for storing representations of the GPS signal for certain time periods of the GPS signal. For signal acquisition, the GPS signal is written into the memory as the GPS signal arrives. Then, the code correlation machine 36 plays the same stored GPS signal against different replica PRN codes and code phases until correlation values are found that indicate that the GPS signal has been acquired. Preferably, two memories are used in parallel, so that signal samples are being written into a first memory for a time period of signal while stored signal samples are being processed from a second memory. When the time period is over, the signal samples in the first memory are processed while the second memory is being loaded with new signal samples for a new time period of signal.

Figure 4:
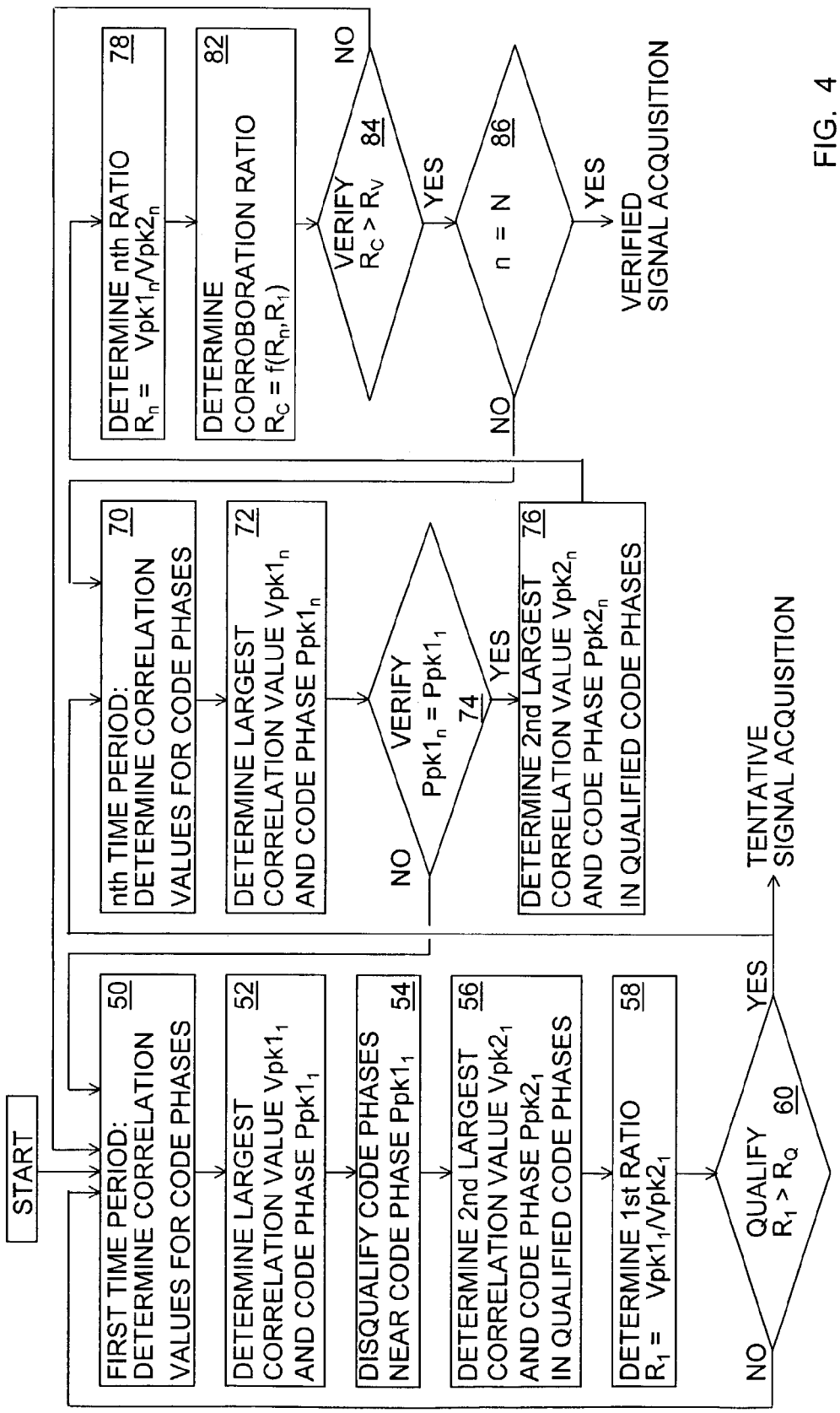
FIG. 4 is a flow chart of a ratio-based acquisition method of the receiver of FIG. 2.

FIG. 4 is a flow chart of the operation of the acquisition detector 14 of the present invention. In a step 50 for a first or initial time period, values for correlations between the intermediate digital GPS signal and the replica PRN code are determined for each replica code phase. The level of the intermediate digital signal may be one or several bits. There is a multibit correlation value for each code phase, respectively. In a preferred embodiment, the spacing of the code phases is one-half chip of the PRN code that is used for spreading the direct sequence spread spectrum signal. For the GPS C/A code with 1023 chips, there are 2046 half-chip code phases and 2046 corresponding correlation values. Other fractions of a chip can also be used. The length of the time period is arbitrary but is typically a multiple of the time period of the PRN spreading code. For example, in one GPS C/A code embodiment, the time period is one hundred milliseconds made up of 10 ten millisecond accumulation time periods.

Figure 1A:
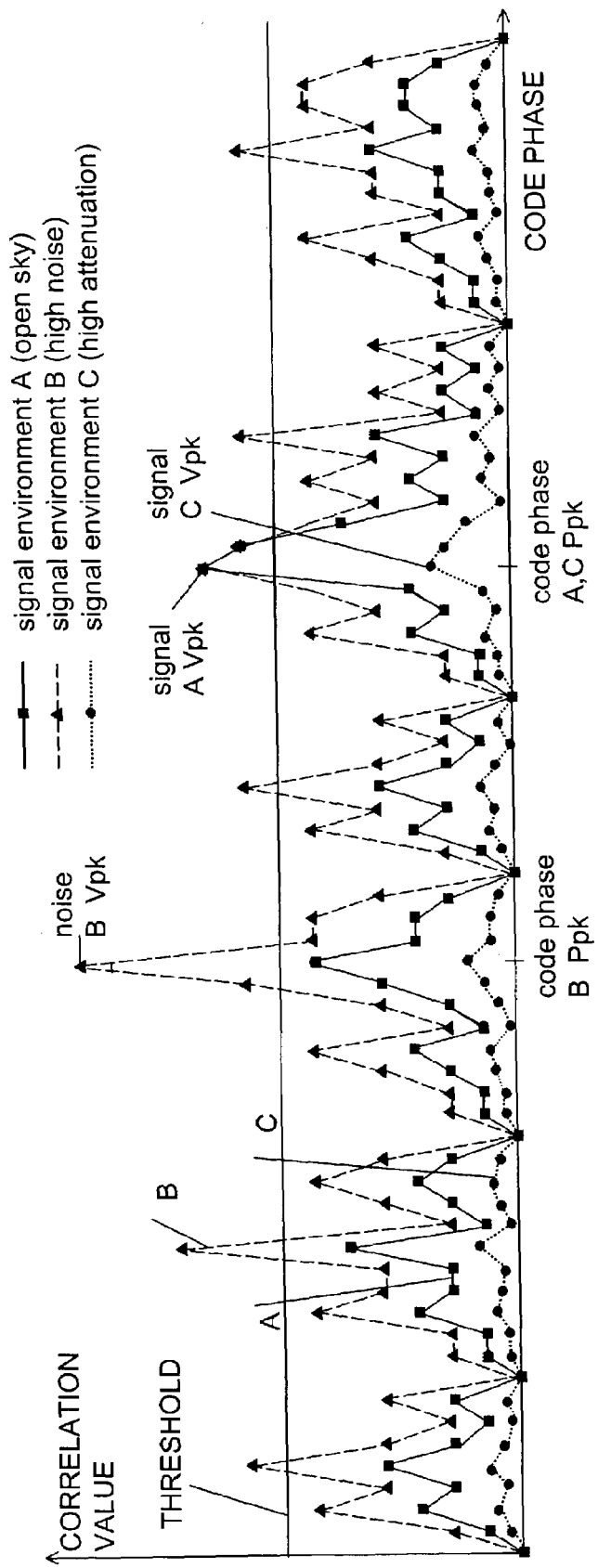
FIG. 1A is a correlation value chart illustrating a threshold-based acquisition detection of the prior art for several signal environments.
Figure 1B:
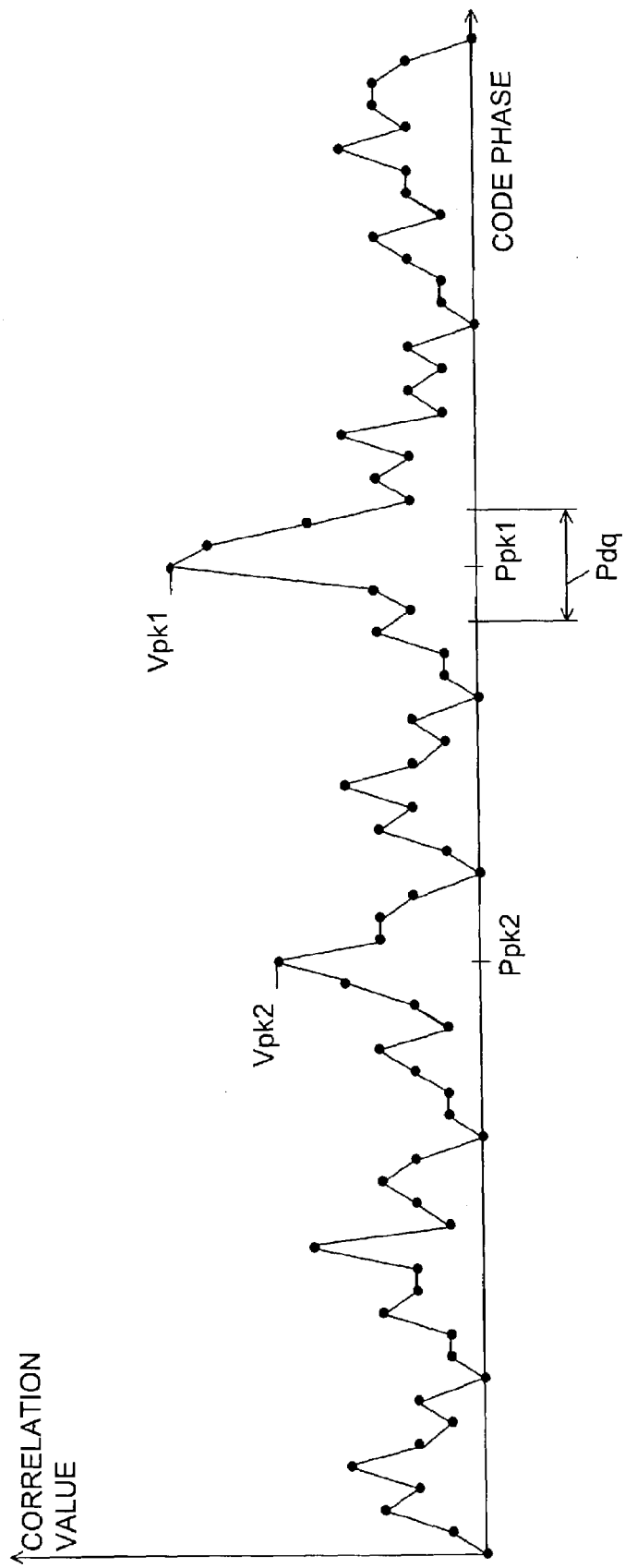
FIG. 1B is a correlation value chart illustrating a ratio-based acquisition detection of the present invention.

The largest of the correlation values, denoted as the first peak one correlation value $Vpk1_1$, is determined in a step 52. A first peak one code phase, denoted as the code phase $Ppk1_1$, corresponding to the first peak one correlation value $Vpk1_1$, is noted. In a step 54 code phases in a range near to the code phase $Ppk1_1$ (code phases Pdq in FIG. 1B) are disqualified. This is done to prevent second largest correlation values from being used that are due to the width of the autocorrelation function or due to multipath.

The code phases having code phase offsets that place the code phases outside the Pdq range are considered qualified. An exemplary range Pdq is two and one-half PRN code chips before the $Ppk1_1$ and two and one-half PRN code chips after the $Ppk1_1$ for a total of five chips However, the range Pdq may be as low as a portion of a chip or much greater than five chips depending upon the expected strength and delay of multipath signals and/or other system characteristics. The range Pdq is not necessarily symmetrical about the code phase $Ppk1_1$. In a step 56 the correlation values are disqualified that correspond to disqualified code phases. The largest correlation value that corresponds to a code phase that is not disqualified is determined as the second largest correlation value, denoted as the first peak two correlation value $Vpk2_1$. The code phase, denoted as the first peak two code phase $Ppk2_1$, corresponding to the first peak two correlation value $Vpk2_1$ is noted.

A first ratio $R_1$ for the first peak one correlation value to the first peak two correlation value $Vpk_1/Vpk2_1$ is determined in a step 58. In a step 60, when the first ratio $R_1 = Vpk1_1/pk2_1$ is greater than a pre-selected qualification ratio $R_Q$, a tentative signal acquisition detection is indicated. The tentative acquisition is then verified or discarded using steps starting at a step 70. When the first ratio $Vpk1_1/Vpk2_1$ is not greater than the qualification ratio $R_Q$, the operation returns to the step 50 to try again. An exemplary value for the qualification ratio $R_Q$ is in the range of 1.2 to 2.0. However, the qualification ratio $R_Q$ can be as little as slightly greater than 1.0 or much greater than 2.0 with the understanding that a low qualification ratio $R_Q$ has a greater chance of detecting a true signal but also has a greater chance of a false detection and vice versa for a high qualification ratio $R_Q$.

For verification, beginning in the step 70, when the first ratio $Vpk1_1/Vpk2_1$ is greater than the qualification ratio $R_Q$, values for correlations between the intermediate digital GPS signal and the replica PRN code are determined for each replica code phase for iteration time periods denoted as nth time periods. When signal memory is used, the first iteration time period of stored GPS signal may or may not include the first time period of the stored GPS signal and subsequent iteration time periods of the stored GPS signal may or may not include previous iteration time periods of the stored GPS signal. When signal memory is not used, each time period has new GPS signal. The verification steps may be iterated several times in order to verify the tentative acquisition detection. The correlation values for signals increase about directly with an increase in time period while the correlation values for noise increase about the square root of the increase in time period. An advantage of the ratio-based method of the present invention over the prior art threshold method is that the qualification and verification ratios $R_Q$ and $R_V$ can remain the same regardless of the length of the time period whereas an optimum threshold must be changed for each time period.

A new largest correlation value, denoted as the nth peak one correlation value $Vpk1_n$, is determined in a step 72. In a step 74, if the peak one code phase $Ppk1_n$ corresponding to the new largest peak one correlation value $Vpk1_n$ is not at the same code phase as the first peak one code phase $Ppk1_1$, the tentative acquisition detection is discarded and the operation returns to the step 50 to try again. In an alternative embodiment, the verification process is continued and the tentative acquisition is retained for further verification if the code phase $Ppk1_n$ matches the code phase $Ppk1_1$ for a selected proportion of the iteration periods. For example, the tentative acquisition may be verified when the $Ppk1_n$ matches the $Ppk1_1$ three out of five times.

When the peak one code phase $Ppk1_n$ is verified, a new peak two correlation value, denoted as correlation value $Vpk2_n$, is determined for a qualified code phase in a step 76. In a step 78 an nth iteration ratio $R_n$ equal to the ratio of the new peak one and peak two correlation values $Vpk1_n/Vpk2_n$ is determined. In a step 82 a corroboration ratio $R_C$ is determined as a function of the first ratio $R_1$ and all the iteration ratios $R_n$. Alternatively, only the iteration ratios $R_n$ are used to determine the corroboration ratio $R_C$. In a preferred embodiment the function is the average for the first ratio $R_1$ and all the iteration ratios $R_n$. A weighted average may also be used.

The corroboration ratio $R_C$ is compared to a selected verification ratio $R_V$ in a step 84. If the corroboration ratio $R_C$ does not exceed the verification ratio $R_V$, the tentative acquisition detection is discarded and the operation returns to the step 50 to try again. In a preferred embodiment the verification ratio $R_V$ is the same as the qualification ratio $R_Q$. In a step 86 when the corroboration ratio $R_C$ exceeds the verification ratio $R_V$ and a selected number N of iteration time periods or total length of time has been analyzed, the tentative signal acquisition is verified. When another iteration is required the operation is returned to the step 70. An exemplary total time length is 500 milliseconds.

Figure 4A:
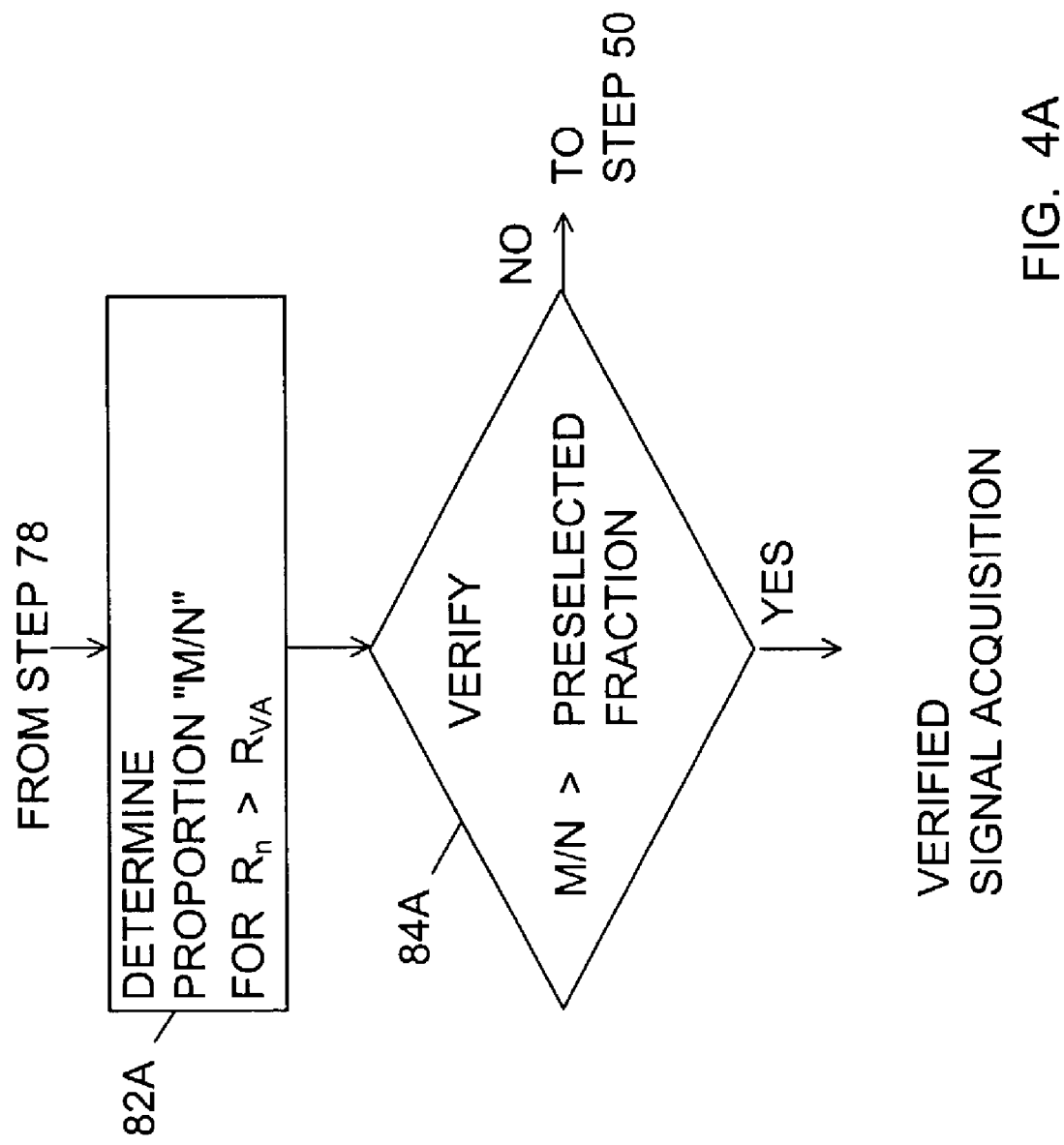
FIG. 4A shows an alternative embodiment for the method of FIG. 4.

FIG. 4A shows an alternative embodiment of the method illustrated in FIG. 4. In a step 82A, after N iterations, a proportion M/N is determined where M is the number of iterations where the iteration ratio $R_n$ exceeds an alternative selected verification ratio $R_{VA}$. Then in a step 84A when the proportion M/N exceeds a preselected fraction, the tentative acquisition is verified. When the proportion M/N does not exceed the preselected fraction, the tentative acquisition is discarded. In a preferred embodiment the verification ratio $R_{VA}$ is the same as the qualification ratio $R_Q$, and the preselected fraction is in a range of 6/10 to 1. Of course a fraction even lower than 6/10 could be used with the understanding that larger fractions decrease the probability of a false detection but also decrease the probability of detecting a true signal.

Figure 5:
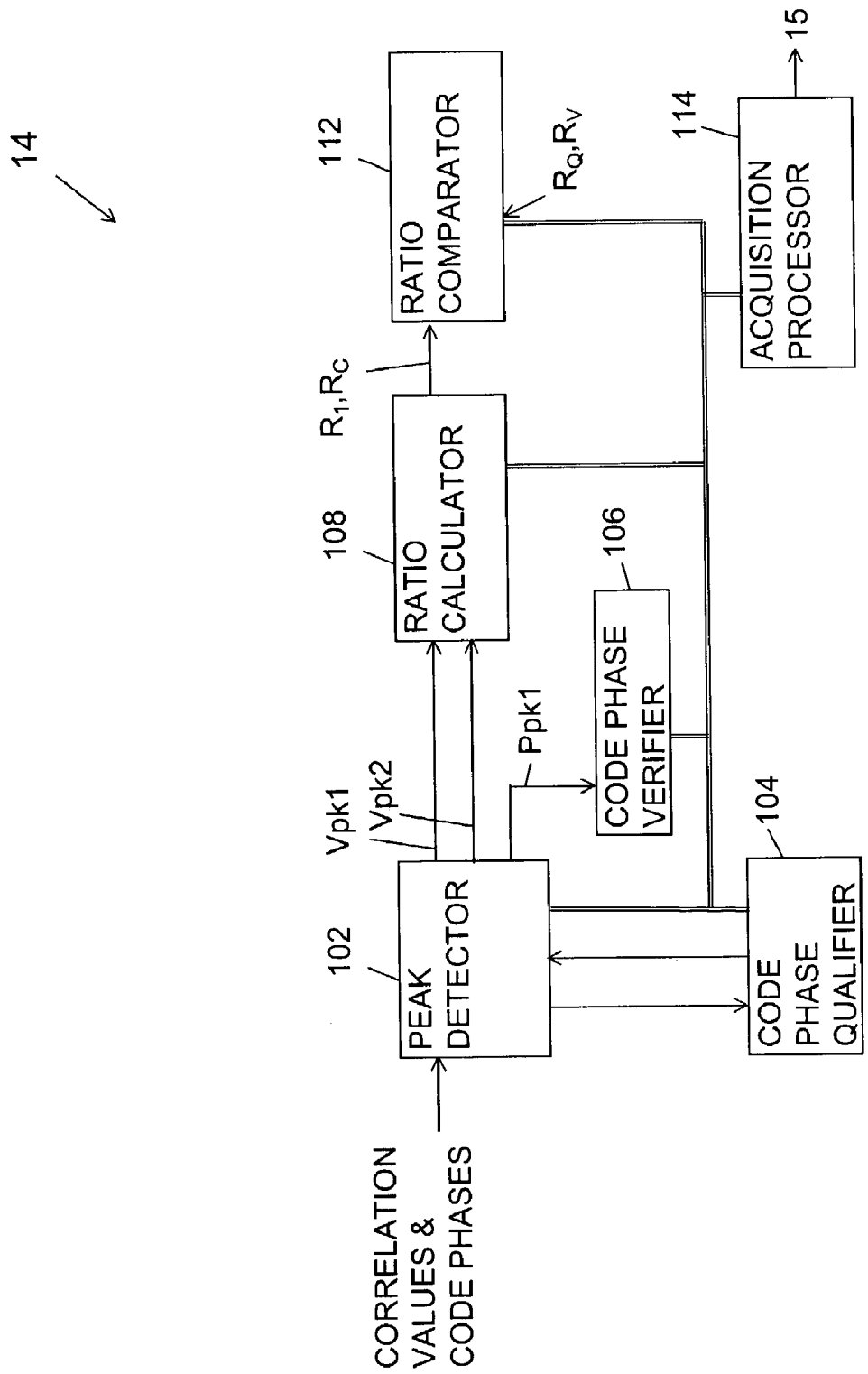
FIG. 5 is a block diagram of an acquisition detector of the receiver of FIG. 2.

FIG. 5 is a block diagram of the acquisition detector 14 of the receiver 10. The acquisition detector 14 includes a peak detector 102, a code phase qualifier 104, a code phase verifier 106, ratio calculator 108, a ratio comparator 112, and an acquisition processor 114. The peak detector 102 detects the peak one and peak two correlation values ($Vpk1_1$ and $Vpk2_1$) for the first time period of accumulations and for subsequent iteration time periods ($Vpk1_n$ and $Vpk2_1$). The code phase qualifier 104 disqualifies the code phases (Pdq in FIG. 1B) that are near to the peak one code phase so only qualified phases are used for the peak two correlation values ($Vpk2_1$ and $Vpk2_n$). The code phase verifier 106 verifies that the verification iteration peak one code phases $Ppk1_n$ are the same as the first peak one code phase $Ppk1_1$. The ratio calculator 108 calculates the first ratio $R_1$ between the peak one and peak two correlation values ($Vpk_1/Vpk2_1$), the nth iteration ratios $R_n$ between the peak one and peak two correlation values ($Vpk1_n/Vpk2_n$), the average of the iteration ratios $R_n$ or first and iteration ratios $R_1$ and $R_n$, and the corroboration ratio $R_C$.

The ratio comparator 112 compares the first ratio $R_1$ to the selected qualification ratio $R_Q$, the corroboration ratio $R_C$ to the selected verification ratio $R_V$ and/or the iteration ratio $R_n$ to the verification ratio $R_{VA}$, and the proportion M/N to the preselected fraction. The acquisition processor 114 operates the peak detector 102, the code phase qualifier 104, the code phase verifier 106, the ratio calculator 108 and the ratio comparator 112; provides the feedback 15 to the signal correlator 12; and issues digital signal data for tentative and verified acquisition detection.

Figure 6:
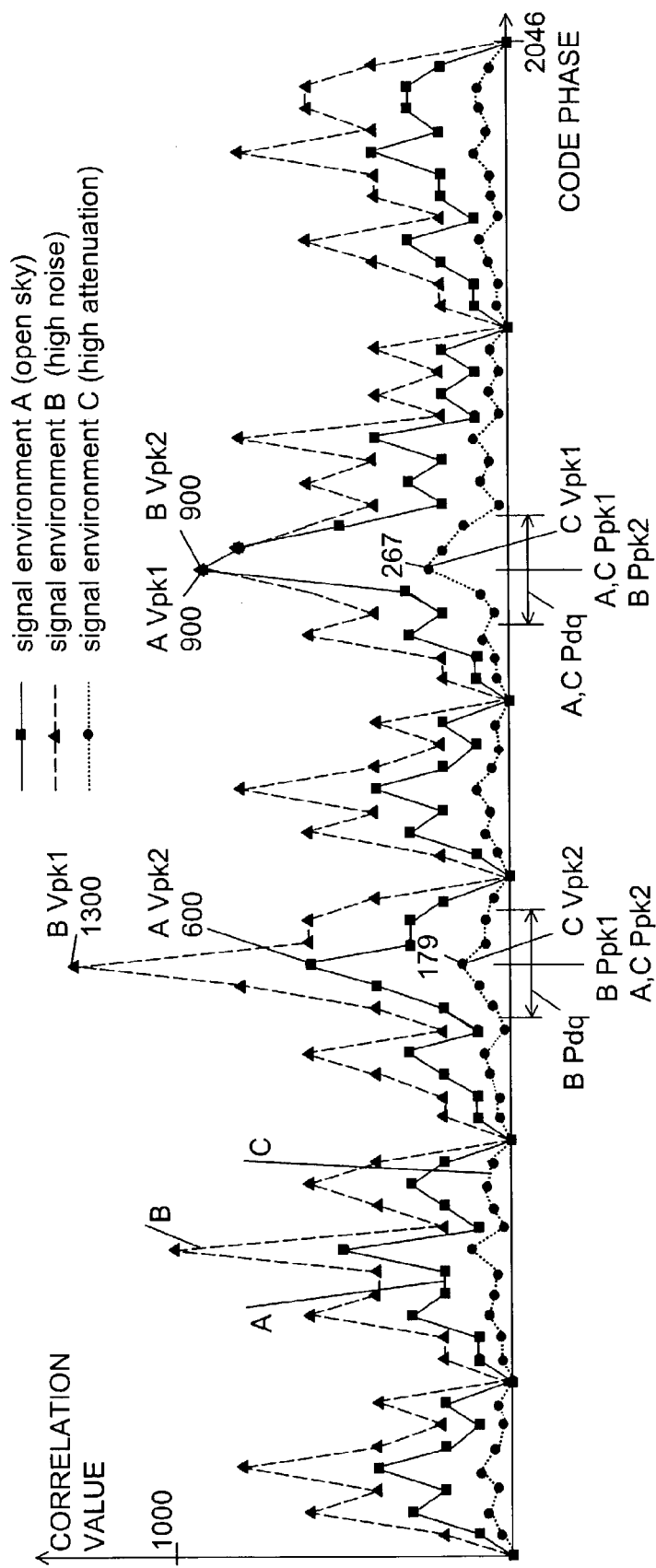
FIG. 6 is a correlation value chart illustrating a ratio-based acquisition detection of the present invention for several signal environments A, B and C.

FIG. 6 shows correlation value plots A, B and C having exemplary numbers for signal environments A, B and C, respectively. The correlation value plot A represents open sky, the correlation value plot B represents high noise, and the correlation value plot C represents high attenuation. FIGS. 7A, 7B and 7C are tables using the same exemplary numbers in a ratio-based signal acquisition method of the present invention for the signal environments A, B and C, respectively. For the purpose of these numerical examples, the qualification ratio $R_Q$ and the verification ratio $R_V$ are selected to be 1.40. First and second (iteration) time periods of signal are used for tentative detection and verification, respectively, where the second time period is selected to be ten times the first time period. For example, the first time period is selected to be one 10 millisecond accumulation time period and the second time period is selected to be one-hundred milliseconds made up of ten 10 millisecond accumulation time periods.

Referring to open sky signal environment A, in the first time period the largest correlation value (A Vpk1 in FIG. 6 and $Vpk1_1$ in FIG. 7A) is 900 at a certain code phase (A Ppk1 in FIG. 6 and $Ppk1_1$ in FIG. 7A). The code phases in the range A Pdq about code phase A Ppk1 are disqualified for the determination of the second largest correlation value. The qualified second largest correlation value (A Vpk2 in FIG. 6 and Vpk2 in FIG. 7A) is 600 at another certain code phase (A Ppk2 in FIG. 6 and $Ppk2_1$ in FIG. 7A). The first ratio $R_1$ ($Vpk_1/Vpk2_1$) is calculated at 1.50. The tentative acquisition detection is asserted because $R_1$ (1.50) is greater than the qualification ratio $R_Q$ (1.40).

In order to verify the tentative acquisition detection the second, ten times longer time period (iteration time period) is observed. In the second time period the largest correlation value ($Vpk1_2$ in FIG. 7A) is on average about 9000 (the longer second time period statistically accentuates the signal by the ratio of the second to first time periods) at a certain code phase ($Ppk1_2$ in FIG. 7A). The peak one correlation value $Vpk1_1$ is due to signal rather than noise so the peak two code phase $Ppk1_2$ in the second time period typically matches the peak one code phase $Ppk1_1$ in the first time period. Therefore the peak one phase verification test is typically passed.

Again, the code phases in the range A Pdq about code phase A Ppk1 are disqualified for the determination of the second largest correlation value. The qualified second largest correlation value ($Vpk2_2$ in FIG. 7A) is on average about 1897 (the longer second time period statistically accentuates the noise by the square root of the ratio of the second to first time periods) and occurs at a random code phase because it is due to noise. For this numerical example, we assume the average statistics. The second ratio $R_2$ ($Vpk1_2/Vpk2_2$) is calculated at 4.74. The corroboration ratio $R_C$ of the average of $R_1$ and $R_2$ is calculated at 3.12. The corroboration ratio $R_C$ (3.12) is greater than the verification ratio $R_V$ (1.40). Therefore the tentative acquisition detection is verified.

Referring to the high noise signal environment B, in the first time period the largest correlation value (B Vpk1 in FIG. 6 and $Vpk1_1$ in FIG. 7B) is 1300 at code phase B Ppk1. The code phases in the range B Pdq about code phase B Ppk1 are disqualified for the determination of the second largest correlation value. The second largest correlation value (B Vpk2 in FIG. 6 and $Vpk2_1$ in FIG. 7B) is 900 at another certain code phase (B Ppk2 in FIG. 6 and $Ppk2_1$ in FIG. 7B) that, in this numerical example, is outside the code phase range Pdq. The first ratio $R_1$ ($Vpk1_1/Vpk2_1$) is calculated at 1.44. The tentative acquisition detection is asserted because $R_1$ (1.44) is greater than the qualification ratio $R_Q$ (1.40).

In order to verify the tentative acquisition detection the second, ten times longer time period (iteration time period) is observed. The largest correlation value ($Vpk1_2$ in FIG. 7B) is on average about 4111 (the longer second time period statistically accentuates the noise by the ratio of the square root of the second to first time periods). However, the correlation value B Vpk1 is due to noise rather than signal so the peak two code phase ($Ppk1_2$ in FIG. 7B) in the second time period occurs at a random code phase that is unlikely to match the peak one code phase (B Ppk1 in FIG. 6 and $Ppk1_1$ in FIG. 7B) in the first time period. Therefore the peak one phase verification test is typically failed and the tentative acquisition detection is discarded.

Referring to the high attenuation signal environment C, in the first time period the largest correlation value (C Vpk1 in FIG. 6 and $Vpk1_1$ in FIG. 7C) is 267 at a certain code phase (C Ppk1 in FIG. 6 and $Ppk1_1$ in FIG. 7C). The code phases in the range C Pdq about code phase C $Ppk1_1$ are disqualified for the determination of the second largest correlation value. The qualified second largest correlation value (C Vpk2 in FIG. 6 and $Vpk2_1$ in FIG. 7C) is 179 at another certain code phase (C Ppk2 in FIG. 6 and $Ppk2_1$ in FIG. 7C). The first ratio $R_1$ equal to $Vpk1_1/Vpk2_1$ is calculated at 1.49. The tentative acquisition detection is asserted because $R_1$ (1.49) is greater than the qualification ratio $R_Q$ (1.40).

In order to verify the tentative acquisition detection the second, ten times longer time period (iteration time period) is observed. When the signal and noise are equally attenuated, the signal is greater than the noise. The largest correlation value ($Vpk1_2$ in FIG. 7C) is statistically an average of about 2670 at a certain code phase ($Ppk1_2$ in FIG. 7C). Because the peak one correlation value C Vpk1 is due to signal rather than noise, the peak two code phase $Ppk1_2$ in the second time period typically matches the peak one code phase $Ppk1_1$ in the first time period, therefore the peak one phase verification test is typically passed.

Again, the code phases in the range C Pdq about code phase C $Ppk1_1$ are disqualified for the determination of the second largest correlation value. The qualified second largest correlation value ($Vpk2_2$ in FIG. 7C) is statistically an average of about 566 and occurs at a random code phase because it is due to noise. For this example, we assume the average statistical levels. The second ratio $R_2$ equal to $Vpk1_2/Vpk2_2$ is calculated at 4.72. The corroboration ratio $R_C$ of the average of $R_1$ and $R_2$ is calculated at about 3.10. The corroboration ratio $R_C$ (3.10) is greater than the verification ratio $R_V$ (1.40). Therefore the tentative acquisition detection is verified.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for acquiring a direct sequence spread spectrum (DSSS) signal, comprising:
   determining first correlation values at code phases, respectively, for a first period of said DSSS signal;
   determining a largest of said first correlation values as a first pk1 value, said first pk1 value having a corresponding first pk1 phase of said code phases;
   determining a qualified second largest of said first correlation values as a first pk2 value, said first pk2 value having a corresponding first pk2 phase of said code phases;
   calculating a first ratio of said first pk1 value to said first pk2 value; and
   determining tentative acquisition of said DSSS signal when said first ratio exceeds a selected qualification ratio.

2. The method of claim 1, wherein:
   the step of determining said qualified second largest of said first correlation values includes qualifying said code phases having at least certain phase offsets from said first pk1 phase; and determining said qualified second largest of said first correlation values only for said first correlation values corresponding to said qualified code phases.

3. The method of claim 1, further comprising:
   determining second correlation values at said code phases, respectively, for a second period of said DSSS signal;
   determining a largest of said second correlation values as a second pk1 value, said second pk1 value having a corresponding second pk1 phase of said code phases; and
   discarding said tentative acquisition when said second pk1 phase does not match said first pk1 phase.

4. The method of claim 3, further comprising:
determining a qualified second largest of said second correlation values as a second pk2 value;
calculating a second ratio of said second pk1 value to said second pk2 value;
calculating a corroboration ratio as a function of said first ratio and said second ratio; and
discarding said tentative acquisition unless said corroboration ratio exceeds a selected verification ratio.

5. The method of claim 4, wherein:
the step of calculating said corroboration ratio includes calculating an average of said first ratio and said second ratio.

6. The method of claim 1, further comprising:
determining one or more sets of iteration correlation values in one or more iteration periods, respectively, of said DSSS signal, said iteration correlation values determined for said code phases, respectively;
determining one or more largest of said iteration correlation values in said one or more sets, respectively, of said iteration correlation values, said one or more largest of said iteration values determined as one or more iteration pk1 values, respectively, said iteration pk1 values having corresponding iteration pk1 phases for said code phases; and
discarding said tentative acquisition unless a selected portion of said iteration pk1 phases match said first pk1 phase.

7. The method of claim 6, further comprising:
determining one or more qualified second largest of said iteration correlation values for said one or more sets, respectively, of said iteration correlation values, said one or more qualified second largest of said iteration correlation values determined as one or more iteration pk2 values, respectively;
calculating one or more iteration ratios of said second pk1 value to said second pk2 value for said one or more iteration periods, respectively; and
using said iteration ratios with at least one selected verification ratio for determining when said tentative acquisition is verified.

8. The method of claim 7, wherein:
the step of using said iteration ratios includes calculating a corroboration ratio as an average of one of (i) said iteration ratios and (ii) said first and said iteration ratios; and verifying said tentative acquisition when said corroboration ratio exceeds a selected verification ratio.

9. The method of claim 8, wherein:
said qualification ratio equals said verification ratio.

10. The method of claim 7, wherein:
the step of using said iteration ratios includes verifying said tentative acquisition when a certain portion of said iteration ratios exceed one or more selected verification ratios.

11. The method of claim 7, wherein:
the step of using said iteration ratios includes calculating at least one corroboration ratio as one of (i) a ratio of one of said iteration ratios to said first ratio and (ii) a ratio of one of said iteration ratios to a previous one of said iteration ratios; and verifying said tentative acquisition when said corroboration ratio exceeds a selected verification ratio.

12. The method of claim 1, wherein:
said DSSS signal is a global positioning system (GPS) signal.

13. A receiver for acquiring a direct sequence spread spectrum (DSSS) signal, comprising:
a signal correlator for determining first correlation values at code phases, respectively, for a first period of said DSSS signal;
a peak detector for determining a largest of said first correlation values as a first pk1 value, said first pk1 value having a corresponding first pk1 phase of said code phases, and determining a qualified second largest of said first correlation values as a first pk2 value, said first pk2 value having a corresponding first pk2 phase of said code phases;
a ratio calculator for calculating a first ratio of said first pk1 value to said first pk2 value; and
an acquisition processor for determining tentative acquisition of said DSSS signal when said first ratio exceeds a selected qualification ratio.

14. The receiver of claim 13, further comprising:
a code phase qualifier for qualifying said code phases having at least certain phase offsets from said first pk1 phase; and wherein:
the peak detector determines said qualified second largest of said first correlation values only for said first correlation values corresponding to said qualified code phases.

15. The receiver of claim 13, wherein:
the signal correlator determines second correlation values at said code phases, respectively, for a second period of said DSSS signal;
the peak detector determines a largest of said second correlation values as a second pk1 value, said second pk1 value having a corresponding second pk1 phase of said code phases; and
the acquisition processor discards said tentative acquisition when said second pk1 phase does not match said first pk1 phase.

16. The receiver of claim 15, wherein:
the peak detector determines a qualified second largest of said second correlation values as a second pk2 value;
the ratio calculator calculates a second ratio of said second pk1 value to said second pk2 value and calculates a corroboration ratio as a function of said first ratio and said second ratio; and
the acquisition processor discards said tentative acquisition unless said corroboration ratio exceeds a selected verification ratio.

17. The receiver of claim 16, wherein:
the ratio calculator calculates said corroboration ratio as an average of said first ratio and said second ratio.

18. The receiver of claim 13, wherein:
the signal correlator determines one or more sets of iteration correlation values in one or more iteration periods, respectively, of said DSSS signal, said iteration correlation values determined for said code phases, respectively;
the peak detector determines one or more largest of said iteration correlation values in said one or more sets, respectively, of said iteration correlation values, said one or more largest of said iteration values determined as one or more iteration pk1 values, respectively, said iteration pk1 values having corresponding iteration pk1 phases for said code phases; and
the acquisition processor discards said tentative acquisition unless a selected portion of said iteration pk1 phases match said first pk1 phase.

19. The receiver of claim 18, wherein:

the peak detector determines one or more qualified second largest of said iteration correlation values for said one or more sets, respectively, of said iteration correlation values, said one or more qualified second largest of said iteration correlation values determined as one or more iteration pk2 values, respectively;

the ratio calculator calculates one or more iteration ratios of said second pk1 value to said second pk2 value for said one or more iteration periods, respectively; and the acquisition processor uses said iteration ratios with at least one selected verification ratio for determining when said tentative acquisition is verified.

20. The receiver of claim 19, wherein:

the acquisition processor calculates a corroboration ratio as an average of one of (i) said iteration ratios and (ii) said first and said iteration ratios; and verifies said tentative acquisition when said corroboration ratio exceeds a selected verification ratio.

21. The receiver of claim 20, wherein:

said qualification ratio equals said verification ratio.

22. The receiver of claim 19, wherein:

the acquisition processor verifies said tentative acquisition when a selected portion of one of (i) said iteration ratios and (ii) said first and iteration ratios exceed one or more selected verification ratios.

23. The receiver of claim 19, wherein:

the acquisition processor calculates at least one corroboration ratio as one of (i) a ratio of one of said iteration ratios to said first ratio and (ii) a ratio of one of said iteration ratios to a previous one of said iteration ratios; and verifying said tentative acquisition when said corroboration ratio exceeds a selected verification ratio.

24. The receiver of claim 13, wherein:

said DSSS signal is a global positioning system (GPS) signal.

25. The method of claim 1, wherein:

said first pk1 value can be any value.

26. The receiver of claim 13, wherein:

said first pk1 value can be any value.

* * * * *